(12) United States Patent
Chang et al.

(10) Patent No.: US 9,591,288 B2
(45) Date of Patent: Mar. 7, 2017

(54) THREE-DIMENSIONAL IMAGE APPARATUS AND OPERATION METHOD THEREOF

(71) Applicants: Chi-Lung Chang, Hsinchu County (TW); Cyun-Fang Hsu, Hsinchu (TW); Li-Han Wu, Hsinchu (TW); Po-Chuan Kang, Hsinchu (TW)

(72) Inventors: Chi-Lung Chang, Hsinchu County (TW); Cyun-Fang Hsu, Hsinchu (TW); Li-Han Wu, Hsinchu (TW); Po-Chuan Kang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 462 days.

(21) Appl. No.: 14/141,434

(22) Filed: Dec. 27, 2013

(65) Prior Publication Data

US 2014/0362189 A1  Dec. 11, 2014

(30) Foreign Application Priority Data

Jun. 7, 2013  (TW) .............................. 102120368 A (51) Int. Cl.
*H04N 15/00* (2006.01)
*H04N 13/02* (2006.01)

(52) U.S. Cl.
CPC .............................. *H04N 13/0253* (2013.01)

(58) Field of Classification Search
USPC ........ 348/49, 50, 46, 51, 54, 64, 67, 73, 25, 348/14.02, 135, 136, 142, 158, 169, 174, 348/207.1, 207.2, 207.11, 208.14, 210.99, 348/211.3, 260, 333.1, 376, 730, 744, 348/745; 356/603, 606, 607, 608, 611, 356/614, 616, 622, 625, 403, 404; 345/175, 419, 426, 597, 619
See application file for complete search history.

(56) References Cited

U.S. PATENT DOCUMENTS 4,212,073 A  7/1980  Balasubramanian
4,641,972 A  2/1987  Halioua et al.
(Continued)

FOREIGN PATENT DOCUMENTS

TW  580556  3/2004
TW  I271986  1/2007
(Continued)

*Primary Examiner* — Michael Lee
*Assistant Examiner* — Mustafizur Rahman
(74) *Attorney, Agent, or Firm* — Jianq Chyun IP Office (57) ABSTRACT

A three-dimensional image apparatus and an operation method thereof are provided. The three-dimensional image apparatus includes a projection unit, a photographic apparatus, a display module and a control unit. In a scan mode, the control unit controls the projection unit to project a structure-light pattern onto an object to be captured in different angles relatively to the object and controls the photographic apparatus to capture a plurality of composition images corresponding to different angles of the object. The composition images are converted into a three-dimensional image in a three dimensional image format through an image conversion module, and the three-dimensional-format image may display a displaying image of the object in a specific viewing angle through the display module. The projection unit and the photographic apparatus are located at a same side of the three-dimensional image apparatus.

18 Claims, 5 Drawing Sheets

(56) References Cited

U.S. PATENT DOCUMENTS

| | | | |
|---|---|---|---|
| 4,657,394 A | 4/1987 | Halioua | |
| 6,263,234 B1 | 7/2001 | Engelhardt et al. | |
| 6,354,477 B1* | 3/2002 | Trummer | A45C 3/02 |
| | | | 224/153 |
| 6,501,554 B1 | 12/2002 | Hackney et al. | |
| 6,750,899 B1 | 6/2004 | Fishbaine et al. | |
| 6,977,732 B2 | 12/2005 | Chen et al. | |
| 7,397,550 B2 | 7/2008 | Hackney et al. | |
| 7,742,633 B2 | 6/2010 | Huang et al. | |
| 8,416,240 B1 | 4/2013 | Kuffner, Jr. et al. | |
| 2003/0016292 A1* | 1/2003 | Lee | H04N 1/0044 |
| | | | 348/222.1 |
| 2003/0234346 A1* | 12/2003 | Kao | G06F 3/0428 |
| | | | 250/221 |
| 2006/0176062 A1* | 8/2006 | Yang | G01V 3/08 |
| | | | 324/663 |
| 2007/0189752 A1* | 8/2007 | Kobayashi | G03B 15/03 |
| | | | 396/157 |
| 2008/0153550 A1* | 6/2008 | Otaka | H04N 1/387 |
| | | | 455/566 |
| 2008/0219594 A1* | 9/2008 | Yeo | H04N 9/3188 |
| | | | 382/299 |
| 2008/0309777 A1* | 12/2008 | Aoyama | G06K 9/00228 |
| | | | 348/222.1 |
| 2009/0046159 A1* | 2/2009 | Okamoto | H04N 1/00278 |
| | | | 348/207.99 |
| 2009/0059173 A1* | 3/2009 | Azor | G03B 21/26 |
| | | | 353/20 |
| 2009/0122130 A1* | 5/2009 | Tsukada | G06Q 30/0283 |
| | | | 348/14.02 |
| 2010/0124949 A1* | 5/2010 | Demuynck | G06F 1/1626 |
| | | | 455/569.1 |
| 2010/0188400 A1* | 7/2010 | Chen | G06T 7/0057 |
| | | | 345/420 |
| 2011/0018897 A1* | 1/2011 | Uchiyama | G03B 21/00 |
| | | | 345/619 |
| 2011/0128354 A1* | 6/2011 | Tien | G06T 7/0018 |
| | | | 348/50 |
| 2011/0188780 A1* | 8/2011 | Wang | G06T 7/0059 |
| | | | 382/293 |
| 2011/0242430 A1* | 10/2011 | Qi | H04N 21/4104 |
| | | | 348/730 |
| 2011/0292347 A1 | 12/2011 | Zhang et al. | |
| 2011/0320969 A1* | 12/2011 | Hwang | G06F 1/1626 |
| | | | 715/765 |
| 2012/0027307 A1* | 2/2012 | Naruse | G01B 9/04 |
| | | | 382/199 |
| 2012/0044456 A1* | 2/2012 | Hayashi | A61B 3/102 |
| | | | 351/206 |
| 2013/0021454 A1* | 1/2013 | Lee | H04N 13/0022 |
| | | | 348/51 |
| 2013/0076865 A1* | 3/2013 | Tateno | G01B 11/03 |
| | | | 348/46 |
| 2013/0107015 A1* | 5/2013 | Morioka | H04N 13/025 |
| | | | 348/48 |
| 2013/0182002 A1* | 7/2013 | Macciola | H04N 1/387 |
| | | | 345/589 |
| 2014/0009580 A1* | 1/2014 | Yu | G01B 11/2513 |
| | | | 348/46 |
| 2014/0168212 A1* | 6/2014 | Jones | G06T 7/0071 |
| | | | 345/420 |

FOREIGN PATENT DOCUMENTS

| | | |
|---|---|---|
| TW | M395155 | 12/2010 |
| TW | I358525 | 2/2012 |
| TW | I358606 | 2/2012 |
| TW | M424513 | 3/2012 |
| TW | M436176 | 8/2012 |
| TW | I371699 | 9/2012 |
| TW | I372554 | 9/2012 |

* cited by examiner

THREE-DIMENSIONAL IMAGE APPARATUS AND OPERATION METHOD THEREOF

CROSS-REFERENCE TO RELATED APPLICATION

This application claims the priority benefit of Taiwan application serial no. 102120368, filed on Jun. 7, 2013. The entirety of the above-mentioned patent application is hereby incorporated by reference herein and made a part of this specification.

BACKGROUND OF THE INVENTION

Field of the Invention

The invention generally relates to an image apparatus and an operation method thereof, and more particularly, to a three-dimensional image apparatus and an operation method thereof.

Description of Related Art

In recent years, with the continuous progress of display technology, the demand from users on the display quality of display devices (such as image resolution, color saturation, etc.) is higher and higher. However, in addition to image high resolution and high color saturation, in order to satisfy the requirement of viewing real images by users, the three-dimensional image display is also developed. In addition, both the three-dimensional image scanning technology and the three-dimensional display technology count as a vital issue of the current 3D (three-dimensional) printing technology, which is configured to scan objects to be printed, produce an appropriate three-dimensional image data as the image source for 3D printing, and print out a 3D model of a physical object from the three-dimensional image data assisted by a computer and a printer. Therefore, the technology of scanning an object and producing a three-dimensional image is the key for printing an accurate 3D model.

The traditional three-dimensional image-capturing technology requires a more complex procedure and has expensive cost. The common way of current three-dimensional image shooting method is based on a stereo camera with dual lens where the shooting parameters of the two lenses are adjusted to be consistent so as to obtain three-dimensional images with good imaging effect. However, such architecture based on a stereo camera must use two sets of lenses and sensors, in which the precision is easier to be affect by ambient light, and the software cost is higher. Another shooting method is to use a single-lens camera, where the shooting is accomplished by panning the camera. The significant problem of the second method rests in the stability. When the horizontal panning amount is inaccurate by the control of the user, it likely has an overlarge or a too small parallax to further affect the imaging effect of a three-dimensional image.

Taiwan Patent No. I358525 instructs a method of measuring a surface topography of an object by means of stripe reflection; Taiwan Patent No. I358606 instructs three-dimensional surrounding-field scanning device and a method thereof; Taiwan Patent No. I371699 instructs a method of quickly measuring three dimensional size of a foot through the image of the foot and an apparatus thereof; Taiwan Patent No. I372554 instructs a method detecting image displacements; Taiwan Patent No. M395155 instructs a dynamic object-image sampling device; Taiwan Patent No. 580556 instructs a method of measuring the 3D surface topography of an object and a system thereof; Taiwan Patent No. I271986 instructs accessories of a portable electronic product; Taiwan Patent No. M424513 instructs a micro projection device of a portable communication device; Taiwan Patent No. M436176 instructs a micro projection device for connecting a portable device; U.S. Pat. No. 4,212,073 instructs a Ronchi testing method of an aspheric surface through phase-modulation way; U.S. Pat. No. 4,641,972 instructs a method of measuring a surface contour and a device thereof; U.S. Pat. No. 4,657,394 instructs a device of obtaining a 3D surface contour and a method thereof; U.S. Pat. No. 6,501,554 instructs a 3D scanner and a method of measuring the height and the angle of manufactured parts; U.S. Pat. No. 6,750,899 instructs a solder paste inspection system; U.S. Pat. No. 7,397,550 instructs a system of adjusting and detecting parts and a method thereof; U.S. Pat. No. 7,742,633 instructs a device of quickly measuring three dimensional size of a foot by using a plurality of images and a method thereof; U.S. Pat. No. 6,263,234 instructs a co-focusing surface measuring device; U.S. Pat. No. 6,977,732 instructs a miniature 3D contour scanner; U.S. Published Application No. 20110292347 instructs a 3D interaction of a mobile device; U.S. Pat. No. 8,416,240 instructs that determining a 3D model information from stored images.

SUMMARY OF THE INVENTION

Accordingly, the invention is directed to a three-dimensional image apparatus and an operation method thereof which are able to capture an image in a three-dimensional image format corresponding to an object which is captured.

Other objectives and advantages of the invention should be further indicated by the disclosures of the invention, and omitted herein for simplicity.

To achieve one of, a part of or all of the above-mentioned objectives, or to achieve other objectives, an embodiment of the invention provides a three-dimensional image apparatus, which includes a projection unit, a photographic apparatus, a display module and a control unit. The projection unit is configured to project a structure-light pattern onto an object to be captured in different angles relatively to the object to be captured. The photographic apparatus is configured to capture a plurality of composition images of the object to be captured in different angles, wherein a projection range of the projection unit is within a capturing range of the photographic apparatus. The control unit is coupled to the projection unit, the photographic apparatus and the display module, in which when the three-dimensional image apparatus is in a scan mode, the control unit controls the projection unit to project the structure-light pattern onto the object to be captured and controls the photographic apparatus to correspondingly capture the composition images and provides the composition images to an image conversion module so as to convert the composition images into a three-dimensional image in a three dimensional image format with full-angle, in which the three-dimensional-format image may display a displaying image of the object to be captured in a specific viewing angle through the display module, and the projection unit and the photographic apparatus are located at a same side of the three-dimensional image apparatus.

To achieve one of, a part of or all of the above-mentioned objectives, or to achieve other objectives, an embodiment of the invention provides an operation method of a three-dimensional image apparatus, which includes following steps. When the three-dimensional image apparatus is in a scan mode, a structure-light pattern is projected onto an object to be captured in different angles relatively to the object to be captured through a projection unit. A plurality of composition images corresponding to different angles of the object to be captured are synchronously captured through a photographic apparatus, in which the projection range of the projection unit is within the capturing range of the photographic apparatus and the projection unit and the photographic apparatus are located at a same side of the three-dimensional image apparatus. The composition images are converted into a three-dimensional image in a three dimensional image format with full-angle through an image conversion module. A displaying image of the object to be captured corresponding to a specific viewing angle is displayed through the display module.

Based on the depiction above, the three-dimensional image apparatus and the operation method thereof in the embodiments of the invention are configured to project a structure-light pattern onto an object to be captured through a projection unit and obtain a plurality of composition images of the object to be captured corresponding to different angles through an image-capturing device. Further, an image conversion module is used to convert the composition images into a three-dimensional image in a three dimensional image format with full-angle. In this way, the three-dimensional-format image corresponding to the object to be captured may be produced.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1A:
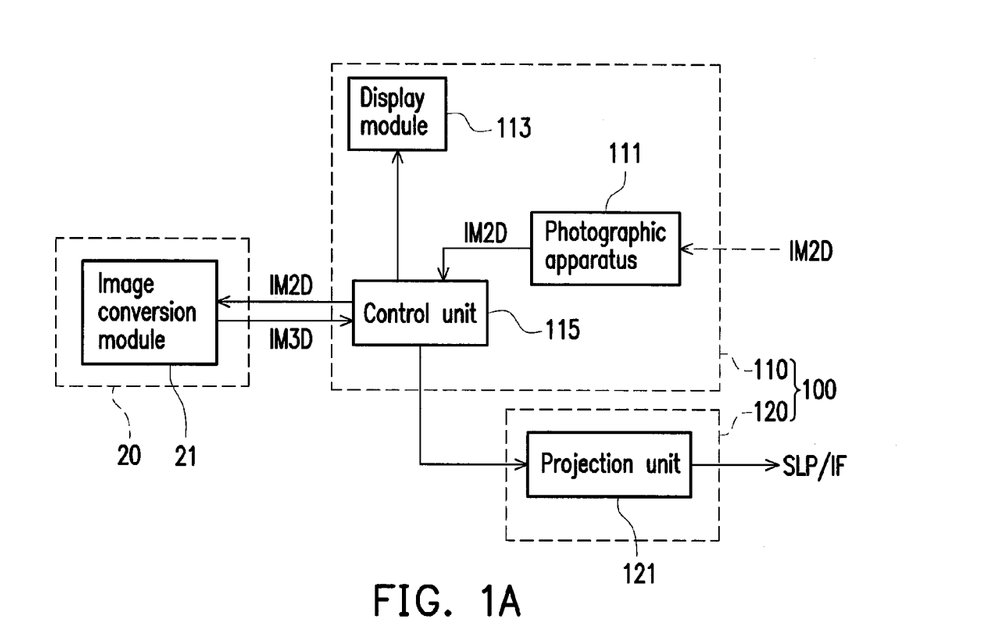
FIG. 1A is a system diagram of a three-dimensional image apparatus according to the first embodiment of the invention.

FIG. 1A is a system diagram of a three-dimensional image apparatus according to the first embodiment of the invention. Referring to FIG. 1A, in the embodiment, a three-dimensional image apparatus 100 includes a portable electronic device 110 and an external device 120. The portable electronic device 110 may be general mobile phone, smart phone, personal digital assistant (PDA), digital camera, multimedia player, tablet computer, and other handheld devices. The external device 120 includes a projection unit 121.

The portable electronic device 110 includes a photographic apparatus 111, a display module 113 and a control unit 115. The control unit 115 is coupled to the projection unit 121, the photographic apparatus 111 and the display module 113. The photographic apparatus 111 may capture a plurality of composition images IM2D in a two dimensional image format, the control unit 115 may be connected to a server 20 via a network interface (not shown), and the server 20 includes an image conversion module 21. That is, the control unit 115 transmits the composition images IM2D captured by the photographic apparatus 111 to the image conversion module 21 in the server 20 via the network interface, the image conversion module 21 may convert the composition images IM2D into a three-dimensional image IM3D which is in a three dimensional image format, and the image conversion module 21 transmits the three-dimensional image IM3D to the three-dimensional image apparatus 100 via the network interface. The server 20 may be a cloud server and the image conversion module 21 may be an image operation software (for example, point cloud operation software). After the image conversion module 21 converts the composition images IM2D into the three-dimensional image IM3D, the three-dimensional image IM3D may be stored in the server 20 or transmitted to the three-dimensional image apparatus 100 for saving. In addition, the above-mentioned network interface includes at least one of wired network interface and wireless network interface, wherein the wired network is, for example, Ethernet, and the wireless network is, for example, CDMA, GSM, NADC, E-TDMA, third-generation (3G) communication systems (such as WCDMA and CDMA2000) and 802.11 a/b/g/n etc.

In the embodiment, when the portable electronic device 110 and the external device 120 combines into the three-dimensional image apparatus 100 may operate in a scan mode or an image-projecting mode, in which the three-dimensional image apparatus 100 switches the operation modes thereof according to the signal input by an input device (not shown), and the input device (not shown) may include at least one of button, switch and touch panel.

When the three-dimensional image apparatus 100 is in the scan mode, the user may dispose the projection unit 121 in different angles relatively to an object to be captured (not shown). The control unit 115 is able to control the projection unit 121 to project a structure-light pattern SLP onto the object to be captured correspondingly to the different angles of the object to be captured, and the control unit 115 synchronously control the photographic apparatus 111 for capturing a plurality of composition images IM2D of the object to be captured in different angles. Thereafter, the control unit 115 provides the composition images IM2D to the image conversion module 21 so as to convert the composition images IM2D into a three-dimensional image IM3D with full-angle. For example, the full-angle can be 360° visual angle, 270° or 45° etc. depending on the application requirement of the user. After the control unit 115 receives the three-dimensional image IM3D from the image conversion module 21, the control unit 115 uses the display module 113 to display a displaying image of the object to be captured in a specific viewing angle according to the three-dimensional image IM3D, in which the control unit 115 may determines the viewing angle according to the signal input from the input device (not shown) by the user and the control unit 115 displays the displaying image of the object to be captured in a specific viewing angle selected by the user through the display module 113. Since the three-dimensional image IM3D presents a three-dimensional appearance of the object to be captured, so that the display module 113 may give out the displaying images of the object to be captured with full-angle (i.e., 360°) by manipulating the input device.

When the three-dimensional image apparatus 100 is switched to the image-projecting mode, the control unit 115 controls the projection unit 121 to projects a projected image IF, in which the projected image IF may be the same as the above-mentioned displaying images of the object to be captured in a specific viewing angle, or other displaying image shown by the display module 113.

In the embodiment, the control unit 115 can adjust the content of the three-dimensional image IM3D according to the signal of the input device (not shown) to accordingly adjust the displaying image displayed by the display module 113 or the projected image IF projected by the projection unit 121.

The control unit 115 provides the composition images IM2D to the image conversion module 21, the image conversion module 21 would analyze a plurality of edge characteristic points of the composition images IM2D and make the corresponding edge characteristic points close to each other or coincide with each other so as to compose the three-dimensional image IM3D with full-angle. For example, the image conversion module 21 may analyze the curves of the object surfaces in each of the composition images IM2D and determine the inflection points of the lines on the object surfaces (the inflection points may be served as the edge characteristic points in the embodiment). Then, whether or not the above-mentioned deflection points are corresponding to each other is determined according to the slope variations of the lines near the inflection points, and the corresponding inflection points close to each other or coincide with each other are made.

Figure 1B:
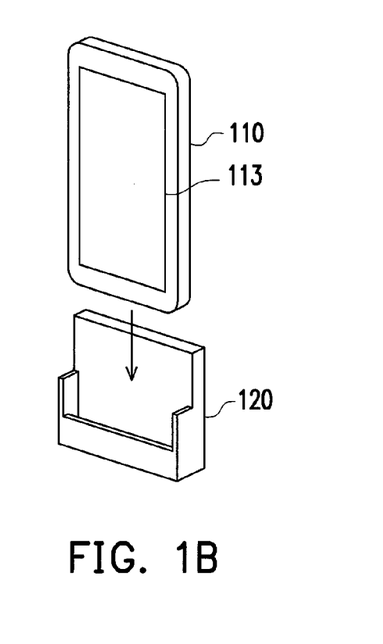
FIGS. 1B and 1C are structure diagrams of the three-dimensional image apparatus according to the first embodiment of the invention.
Figure 1C:
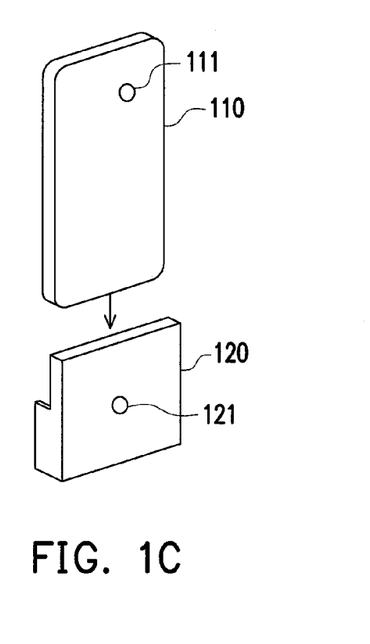

FIGS. 1B and 1C are structure diagrams of the three-dimensional image apparatus according to the first embodiment of the invention. Referring to FIGS. 1A-1C, in the embodiment, the external device 120 is, for example, a base and the projection unit 121 is disposed on the base. The base may be inserted by the portable electronic device 110 and may fix the portable electronic device 110, in which when the portable electronic device 110 is disposed on the base, the projection unit 121 of the external device 120 and the photographic apparatus 111 of the portable electronic device 110 are located at the same side of the three-dimensional image apparatus 100, i.e., the projection direction of the projection unit 121 is substantially the same as the image-capturing direction of the photographic apparatus 111. In addition, the projection unit 121 at a surface of the external device 120 projects the structure-light pattern SLP, while the photographic apparatus 111 at a surface of the portable electronic device 110 captures the images IM2D, in which the above-mentioned surface of the external device 120 is substantially parallel to the above-mentioned surface of the portable electronic device 110.

Figure 1D:
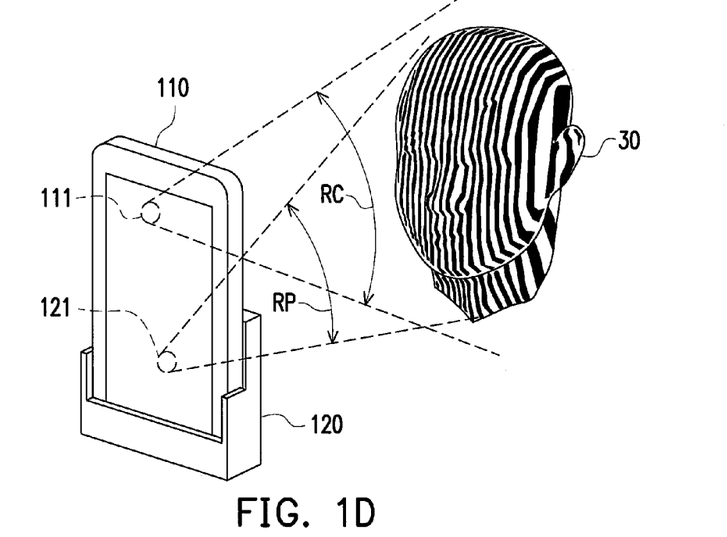
FIG. 1D is a scanning diagram of the three-dimensional image apparatus in a scan mode according to the first embodiment of the invention.

FIG. 1D is a scanning diagram of the three-dimensional image apparatus in a scan mode according to the first embodiment of the invention. Referring to FIGS. 1A and 1D, in the embodiment, when the three-dimensional image apparatus 100 is in the scan mode, the projection unit 121 may project the structure-light pattern SLP onto the object 30 to be captured in different angles relatively to the object 30 to be captured. Since the projection unit 121 and the photographic apparatus 111 are located at the same side of the three-dimensional image apparatus 100, the photographic apparatus 111 can synchronously capture a plurality of composition images IM2D formed by the structure-light pattern SLP on the object 30 to be captured, in which the composition images IM2D are produced since the surface of the object 30 to be captured where the structure-light pattern SLP is projected onto has different presented curvatures or deformations. The composition images IM2D may be produced in other ways including using fine variation of distance or stripe interval of the structure-light pattern SLP. On the object 30 to be captured, the projection range RP of the projection unit 121 is within the capturing range RC of the photographic apparatus 111. The structure-light pattern SLP projected onto the object 30 to be captured by the projection unit 121 is black and white vertical stripe pattern, but the structure-light pattern SLP may be greyscale pattern or color pattern as well; in other embodiments, the structure-light pattern SLP may be horizontal stripe pattern or grid pattern depending on the design of the people skilled in the art, which the invention is not limited to.

Figure 2:
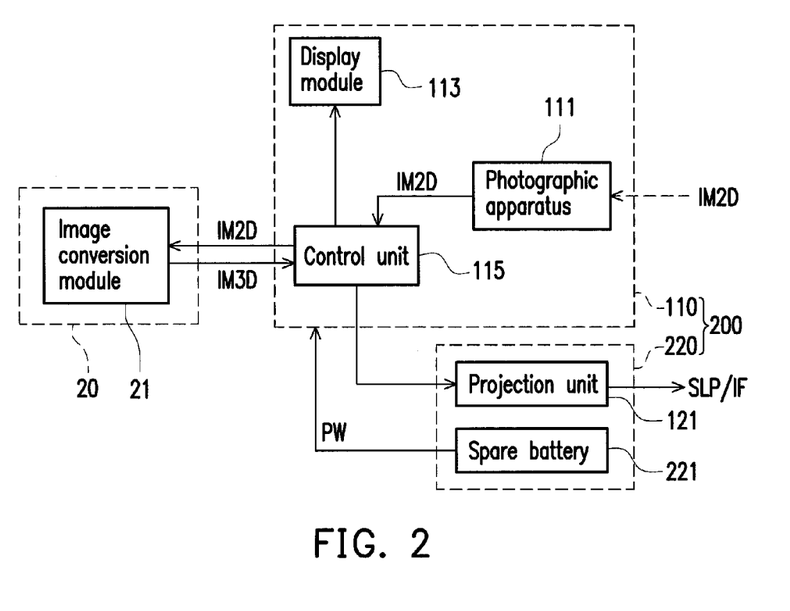
FIG. 2 is a system diagram of a three-dimensional image apparatus according to the second embodiment of the invention.

FIG. 2 is a system diagram of a three-dimensional image apparatus according to the second embodiment of the invention. Referring to FIGS. 1A and 2, a three-dimensional image apparatus 200 is roughly the same as the three-dimensional image apparatus 100 of FIG. 1A except that the external device 220. In the embodiment, the parts same as or similar to the parts in the previous embodiment have the same or similar notations. The external device 220 in the embodiment further includes a spare battery 221 for providing the projection unit 121 with power and providing a spare power PW to the portable electronic device 110 so as to extend the operable time of the portable electronic device 110.

Figure 3:
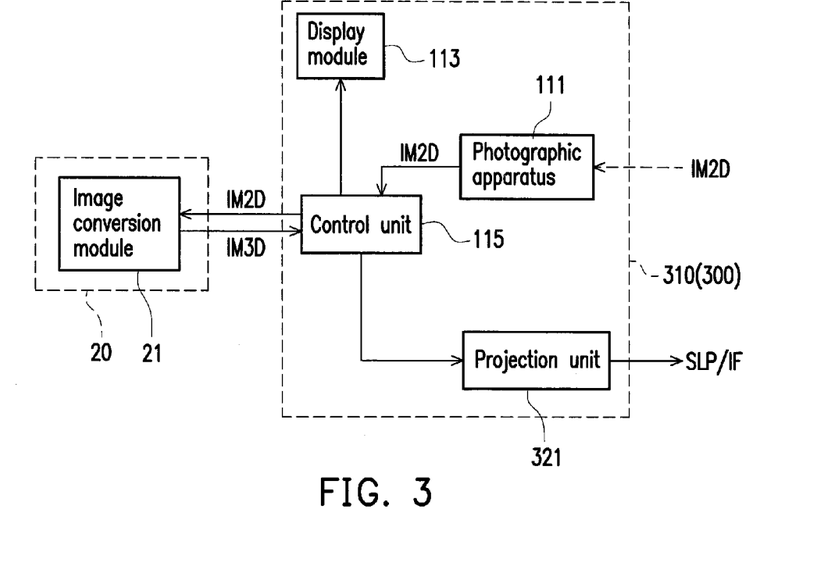
FIG. 3 is a system diagram of a three-dimensional image apparatus according to the third embodiment of the invention.

FIG. 3 is a system diagram of a three-dimensional image apparatus according to the third embodiment of the invention. Referring to FIGS. 1A and 3, a three-dimensional image apparatus 300 is roughly the same as the three-dimensional image apparatus 100 of FIG. 1A except that the portable electronic device 310. In the embodiment, the parts same as or similar to the parts in the previous embodiment have the same or similar notations. The portable electronic device 310 in the embodiment further includes a projection unit 321 where the projection unit 321 is embedded in the portable electronic device 310, and the operation of the projection unit 321 is similar to the projection unit 121, which is omitted to describe. In addition, at the same surface of the portable electronic device 310, the projection unit 121 is provided for projecting the structure-light pattern SLP and the photographic apparatus 111 is provided for capturing the images IM2D.

Figure 4:
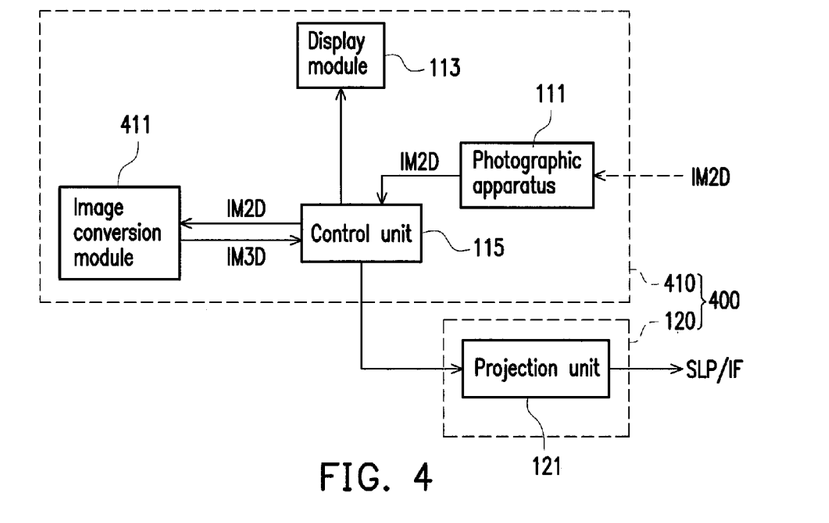
FIG. 4 is a system diagram of a three-dimensional image apparatus according to the fourth embodiment of the invention.

FIG. 4 is a system diagram of a three-dimensional image apparatus according to the fourth embodiment of the invention. Referring to FIGS. 1A and 4, a three-dimensional image apparatus 400 is roughly the same as the three-dimensional image apparatus 100 of FIG. 1A except that the portable electronic device 410. In the embodiment, the parts same as or similar to the parts in the previous embodiment have the same or similar notations. The portable electronic device 410 in the embodiment further includes an image conversion module 411, i.e., the image conversion module 411 is embedded in the portable electronic device 410 without using a network to connect the cloud or the server for converting the images, in which the operation of the image conversion module 411 is similar to the image conversion module 21, which is omitted to describe.

Figure 5:
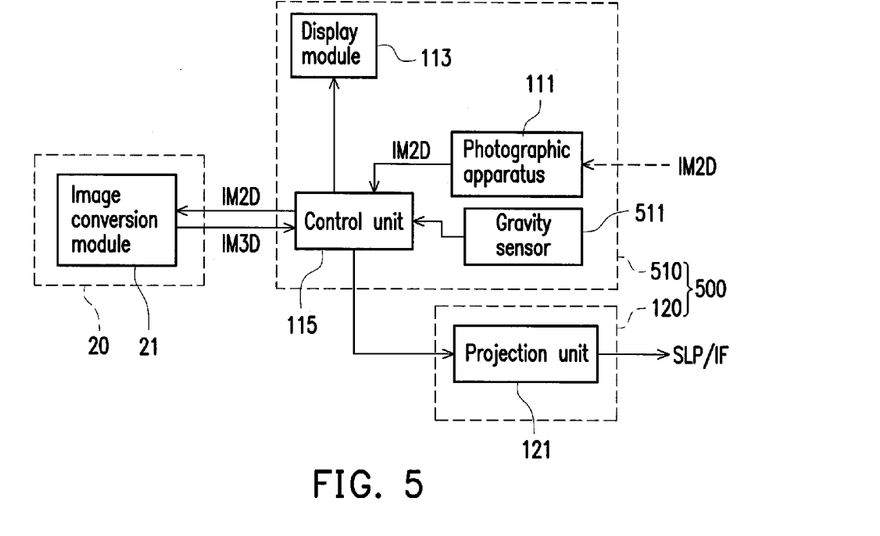
FIG. 5 is a system diagram of a three-dimensional image apparatus according to the fifth embodiment of the invention.

FIG. 5 is a system diagram of a three-dimensional image apparatus according to the fifth embodiment of the invention. Referring to FIGS. 1A and 5, a three-dimensional image apparatus 500 is roughly the same as the three-dimensional image apparatus 100 of FIG. 1A except that the portable electronic device 510. In the embodiment, the parts same as or similar to the parts in the previous embodiment have the same or similar notations. The portable electronic device 510 in the embodiment further includes a gravity sensor 511 for sensing the inclination angle of the portable electronic device 510 (i.e., the inclination angle information). Thereby, when the photographic apparatus 111 is capturing a plurality of images IM2D of the object to be captured in different angles, the gravity sensor 511 can sense the inclination angle information corresponding to each of the composition images IM2D. The control unit 115 then delivers the composition images IM2D and the corresponding inclination angle information to the image conversion module 21. Moreover, the image conversion module 21 determines the horizontally-adjacent composition images IM2D according to the inclination angle information so as to speed up the processing of the image conversion module 21. In other words, the image conversion module 21 may analyse a plurality of edge characteristic points of the composition images IM2D, determine the corresponding edge characteristic points on the horizontal positions according to the inclination angle information corresponding to each of the composition images IM2D and make the corresponding edge characteristic points close to each other or coincide with each other so as to create a three-dimensional image IM3D with full-angle.

Figure 6:
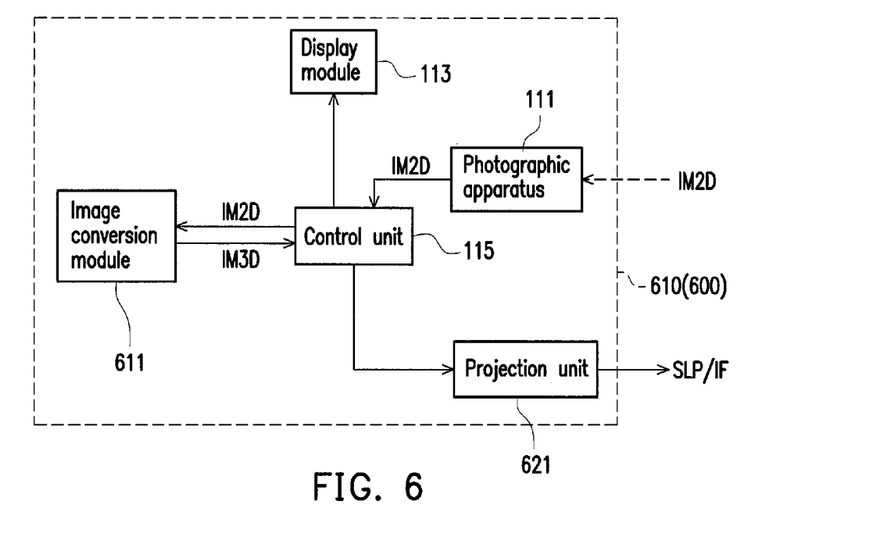
FIG. 6 is a system diagram of a three-dimensional image apparatus according to the sixth embodiment of the invention.

FIG. 6 is a system diagram of a three-dimensional image apparatus according to the sixth embodiment of the invention. Referring to FIGS. 1A and 6, a three-dimensional image apparatus 600 is roughly the same as the three-dimensional image apparatus 100 of FIG. 1A except that the portable electronic device 610. In the embodiment, the parts same as or similar to the parts in the previous embodiment have the same or similar notations. The portable electronic device 610 in the embodiment further includes a projection unit 621 and an image conversion module 611, wherein the projection unit 621 and the image conversion module 611 are embedded in the portable electronic device 610, and the operation of the projection unit 621 is similar to the projection unit 121 and the operation of the image conversion module 611 is similar to the image conversion module 21, which is omitted to describe.

After the three-dimensional image apparatus in the above-mentioned embodiments of the invention produces the three-dimensional image through the image conversion module, the three-dimensional image is transmitted to a 3D printing device (not shown) where the 3D printing device prints out a 3D model of the object which is captured.

Figure 7:
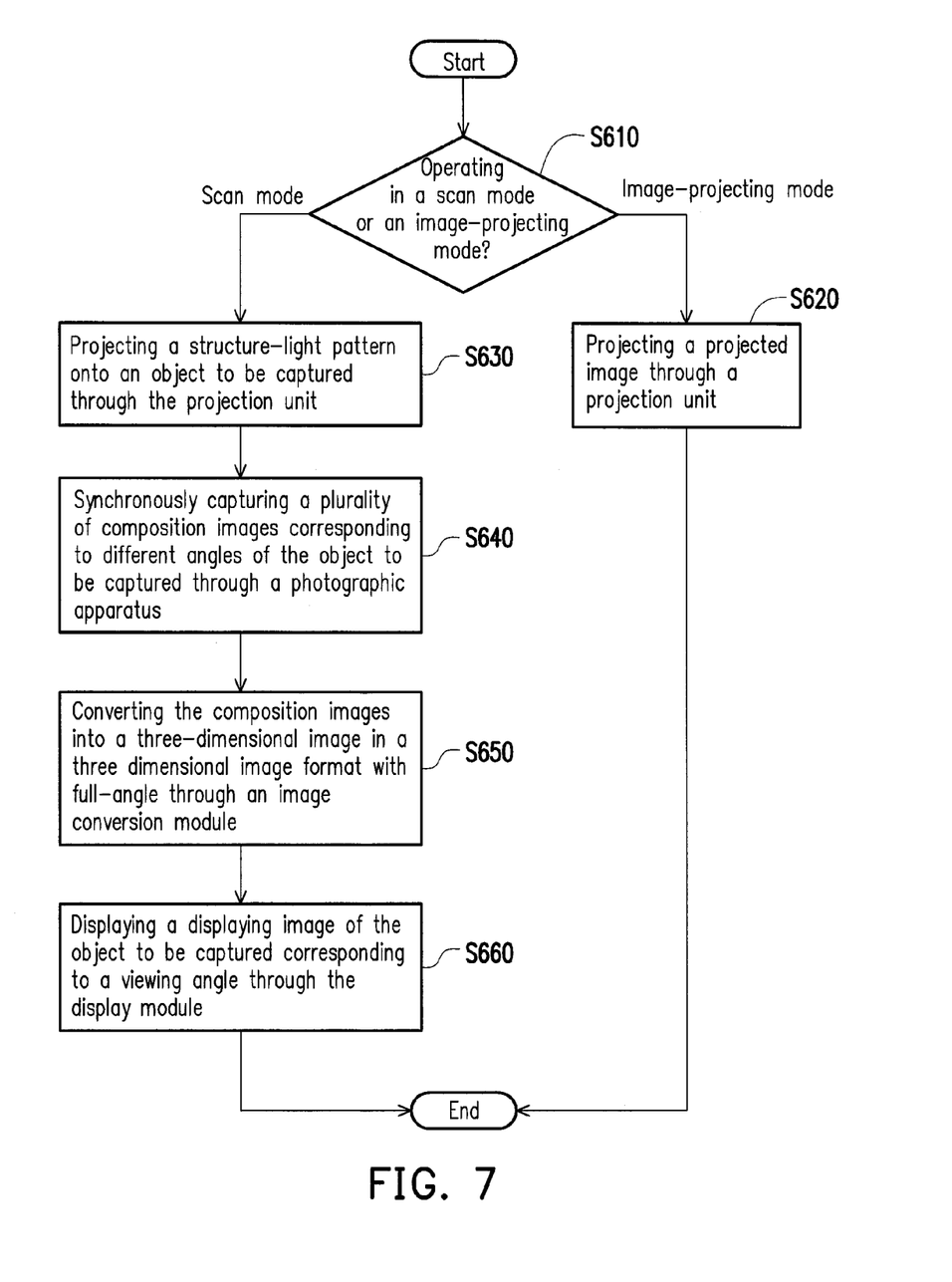
FIG. 7 is a flowchart showing an operation method of a three-dimensional image apparatus according to an embodiment of the invention.

FIG. 7 is a flowchart showing an operation method of a three-dimensional image apparatus according to an embodiment of the invention. Referring to FIG. 7, the operation method of a three-dimensional image apparatus in the embodiment includes following steps. Whether or not the three-dimensional image apparatus is operated in a scan mode or an image-projecting mode is determined (step S610). When the three-dimensional image apparatus is operated in the image-projecting mode, a projected image is projected by a projection unit (step S620); otherwise, when the three-dimensional image apparatus is operated in the scan mode, a structure-light pattern is projected onto an object to be captured through the projection unit (step S630) and a plurality of composition images corresponding to different angles of the object to be captured are synchronously captured through a photographic apparatus (step S640), in which the projection range of the projection unit is within the capturing range of the photographic apparatus and the projection unit and the photographic apparatus are located at a same side of the three-dimensional image apparatus. Then, the composition images are converted into a three-dimensional image in a three dimensional image format with full-angle through an image conversion module (step S650), and a displaying image of the object to be captured corresponding to a viewing angle is displayed through the display module (step S660). The sequence of the above-mentioned steps S610, S620, S630, S640, S650 and S660 herein is an example only, which the invention is not limited to. The details of the above-mentioned steps S610, S620, S630, S640, S650 and S660 can refer to the embodiments of FIGS. 1A-1D and 2-5, which is omitted to describe.

In summary, the three-dimensional image apparatus and the operation method thereof in the embodiments of the invention are configured to project a structure-light pattern onto an object to be captured through a projection unit in different angles relatively to the object to be captured and to synchronously obtain a plurality of composition images of the object to be captured corresponding to different angles through a photographic apparatus. Further, an image conversion module is used to convert the composition images into a three-dimensional-format image with full-angle. In this way, the invention may capture the three-dimensional-format image corresponding to the object to be captured. In addition, by integrating the projection unit and the photographic apparatus required for capturing the image of the object, the portability of the three-dimensional image apparatus is advanced. Moreover, by using the operation interface, the display module, the photographic apparatus and the network interface originally equipped at the portable electronic device in association with an embedded or external projection unit, the invention is capable of scanning the object to be captured and producing the three-dimensional-format image corresponding to the object to be captured, so that the three-dimensional image apparatus has low cost, operation convenience and multiple functions.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A portable three-dimensional image apparatus, comprising:
    a portable electronic device, comprising:
        a photographic apparatus, configured to capture a plurality of composition images of the object to be captured in different angles; and
        a control unit, coupled to the photographic apparatus; and
    a portable external device, coupled to the portable electronic device, comprising:
        a projection unit, coupled to the control unit, the projection unit configured to project a structure-light pattern onto an object to be captured in different angles relatively to the object to be captured;
        wherein when the three-dimensional image apparatus is in a scan mode, the control unit controls the projection unit to project the structure-light pattern and controls the photographic apparatus to correspondingly capture the composition images and provides the composition images to an image conversion module so as to convert the composition images into a three-dimensional image in a three dimensional image format,
        wherein the image conversion module analyzes a plurality of edge characteristic points of the composition images and makes the corresponding edge characteristic points close to each other or coincide with each other so as to compose the three-dimensional image in the three dimensional image format.

2. The three-dimensional image apparatus as claimed in claim 1, wherein the portable electronic device further comprises a display module, the display module being coupled to the control unit and being utilized to display a displaying image of the object to be captured.

3. The three-dimensional image apparatus as claimed in claim 1, wherein the external device is equipped with a spare battery therein for providing a power to the projection unit and a spare power to the portable electronic device.

4. The three-dimensional image apparatus as claimed in claim 1, wherein the image conversion module is located on a server and the control unit is connected to the server via a network interface.

5. The three-dimensional image apparatus as claimed in claim 4, wherein the server is a cloud server.

6. The three-dimensional image apparatus as claimed in claim 4, wherein the network interface comprises at least one of a wired network interface and a wireless network interface.

7. The three-dimensional image apparatus as claimed in claim 1, wherein the portable electronic device is a mobile phone.

8. The three-dimensional image apparatus as claimed in claim 1, wherein the portable electronic device further comprises the image conversion module.

9. The three-dimensional image apparatus as claimed in claim 1, further comprising a gravity sensor for sensing an inclination angle information corresponding to each of the composition images, wherein the image conversion module analyses the edge characteristic points of the composition images, determines the corresponding edge characteristic points according to the inclination angle information corresponding to each of the composition images and makes the corresponding edge characteristic points close to each other or coincide with each other so as to compose the three-dimensional image in the three dimensional image format.

10. The three-dimensional image apparatus as claimed in claim 1, wherein the structure-light pattern is black and white pattern, greyscale pattern or color pattern.

11. The three-dimensional image apparatus as claimed in claim 1, wherein when the three-dimensional image apparatus is in an image-projecting mode, the control unit controls the projection unit to project a projected image.

12. An operation method of a three-dimensional image apparatus, comprising:
    projecting a structure-light pattern onto an object to be captured in different angles relatively to the object to be captured via the three-dimensional image apparatus;
    capturing a plurality of composition images corresponding to different angles of the object to be captured via the three-dimensional image apparatus; and
    converting the composition images into a three-dimensional image in a three dimensional image format via the three-dimensional image apparatus, comprising sub-steps of:
        analysing a plurality of edge characteristic points of the composition images, and
        making the corresponding edge characteristic points close to each other or coincide with each other so as to compose the three-dimensional image in the three dimensional image format via the three-dimensional image apparatus.

13. The operation method of a three-dimensional image apparatus as claimed in claim 12, further comprising:
    transmitting the composition images to the image conversion module located at a server through a network interface; and
    transmitting the three-dimensional image by the image conversion module to the three-dimensional image apparatus through the network interface.

14. The operation method of a three-dimensional image apparatus as claimed in claim 13, wherein the server is a cloud server.

15. The operation method of a three-dimensional image apparatus as claimed in claim 13, wherein the network interface comprises at least one of a wired network interface and a wireless network interface.

16. The operation method of a three-dimensional image apparatus as claimed in claim 12, wherein the structure-light pattern is black and white pattern, greyscale pattern or color pattern.

17. The operation method of a three-dimensional image apparatus as claimed in claim 12, further comprising:
projecting a frame image through the projection unit when the three-dimensional image apparatus is in an image-projecting mode.

18. An operation method of a three-dimensional image apparatus, comprising:
projecting a structure-light pattern onto an object to be captured in different angles relatively to the object to be captured via the three-dimensional image apparatus;
capturing a plurality of composition images corresponding to different angles of the object to be captured by the three-dimensional image apparatus; and
converting the composition images into a three-dimensional image in a three dimensional image format via the three-dimensional image apparatus, comprising the following sub-steps of:
sensing an inclination angle information corresponding to each of the composition images;
analyzing the edge characteristic points of the composition images and determining the corresponding edge characteristic points according to the inclination angle information corresponding to each of the composition images; and
making the corresponding edge characteristic points close to each other or coincide with each other so as to compose the three-dimensional image in the three dimensional image format.

* * * * *